United States Patent [19]

Schnee et al.

[11] Patent Number: 4,824,894
[45] Date of Patent: Apr. 25, 1989

[54] BIODEGRADABLE ORGANOSOL FLOCCULANTS

[75] Inventors: Reiner Schnee, Darmstadt; Angelo Scordialo; Jürgen Masanek, both of Pfungstadt, all of Fed. Rep. of Germany

[73] Assignee: Röhm GmbH Chemische Fabrik, Darmstadt, Fed. Rep. of Germany

[21] Appl. No.: 880,208

[22] Filed: Jun. 30, 1986

[30] Foreign Application Priority Data

Jul. 12, 1985 [DE] Fed. Rep. of Germany ....... 3524950

[51] Int. Cl.$^4$ .................................................. C08K 5/11
[52] U.S. Cl. .................... 524/314; 524/313; 524/315; 524/318; 524/523; 524/827; 524/831
[58] Field of Search ............... 524/314, 827, 832, 831, 524/313, 315, 318, 500, 523

[56] References Cited

U.S. PATENT DOCUMENTS

| | | | |
|---|---|---|---|
| 2,575,553 | 11/1951 | Kolvoort | 524/314 |
| 2,615,858 | 10/1952 | Winkler | 524/314 |
| 2,893,890 | 7/1959 | Harvey, Jr. | 524/314 |
| 3,562,191 | 2/1971 | Giessler | 524/314 |
| 3,624,019 | 11/1971 | Anderson et al. | 260/29.6 H |
| 3,741,923 | 6/1973 | Fritsche et al. | 524/314 |
| 3,778,399 | 12/1973 | Fazioli et al. | 524/314 |
| 3,803,072 | 4/1974 | Graham et al. | 524/314 |
| 3,826,771 | 7/1974 | Anderson et al. | 260/29.6 H |
| 4,070,321 | 1/1978 | Goretta et al. | 524/829 |
| 4,077,930 | 3/1978 | Lim et al. | 524/829 |
| 4,217,262 | 8/1980 | Coscia et al. | 524/801 |
| 4,421,619 | 12/1983 | Graham | 524/314 |
| 4,524,175 | 6/1985 | Stanley, Jr. | 524/801 |
| 4,650,827 | 3/1987 | Becker et al. | 524/801 |
| 4,696,962 | 9/1987 | Danner et al. | 524/812 |

FOREIGN PATENT DOCUMENTS

| | | | |
|---|---|---|---|
| 0130962 | 1/1985 | European Pat. Off. | |
| 0133404 | 10/1980 | Japan | 524/801 |
| 0676763 | 8/1952 | United Kingdom | 524/314 |
| 2115829 | 9/1983 | United Kingdom | |
| 2129432 | 5/1984 | United Kingdom | |

OTHER PUBLICATIONS

Chemical Abstracts, Band 99, Nr. 10, Sep. 1983.

Primary Examiner—Joseph L. Schofer
Assistant Examiner—J. M. Reddick
Attorney, Agent, or Firm—Oblon, Fisher, Spivak, McClelland & Maier

[57] ABSTRACT

Polymer water-in-oil emulsions for the production of aqueous flocculants solutions are described in which the oil phase consists entirely or to a large degree of readily biodegradable compounds and these compounds are aliphatic dicarboxylic esters.

12 Claims, No Drawings

BIODEGRADABLE ORGANOSOL FLOCCULANTS

BACKGROUND OF THE INVENTION

1. Field of the Invention

This invention relates to organosol flocculants, which in an organic phase contain a very finely-distributed water-soluble polymer or a polymer dissolved in water which is composed primarily of acrylic and/or methacrylic monomers.

2. Discussion of the Background

Water-in-oil emulsions of, for instance, high molecular weight polyacrylamides or acrylamide copolymers have achieved particular importance in technical applications as liquid products which have a high percentage of solids while still retaining manageable viscosity. The reversability of the emulsion makes rapid production of aqueous solutions possible. They are also used, particularly as flocculants, in the refining of drinking water, for instance, or in purifying public and industrial effluents.

There are well known procedures for manufacturing water-in-oil emulsions of compounds of high molecular weight by polymerization of water-dissolved, ethylene-unsaturated monomers in an oil-phase. Oils used in the production of polymer water-in-oil emulsions are liquid, non water-soluble, organic substances or mixtures of these substances. Thus, according to DE-A 1 081 228, the oil phase may consist of any inert hydrophobic liquid which may include hydrocarbons and chlorinated hydrocarbons, for example, toluol, xylene, o-dichlorobenzene and propylene dichloride.

According to DE-B 21 54 081, oils from a large group of organic liquids can be used, for instance, liquid hydrocarbons and substituted liquid hydrocarbons, including both aromatic and aliphatic compounds. Benzol, xylol, mineral oils, kerosine, naphthas and an isoparaffin-based oil, which is particularly well-suited, are named as examples of such liquid hydrocarbons. DE-A 22 26 143 also lists the above-mentioned organic substances to create the oil phase and DE-B 24 32 699 again indicates aromatic hydrocarbons and aliphatic hydrocarbons, such as paraffin oils and tetrachloroethylene, for a hydrophobic organic dispersion medium.

DE-A 33 02 069 describes preparations which, among other things, are used as flocculants in which the oil phase may consist exclusively of the above-named aromatic and aliphatic hydrocarbons of natural plant or animal triglycerides, such as olive oil, peanut oil, cotton oil, coconut butter, beet oil, sunflower oil, and of fatty acid monoesters, primarily $C_{1-4}$ alkyl esters of $C_{12-24}$ fatty acids such as oleic, palmitic, or hexadecylic acid. Mixtures of the above may be used if necessary.

EP-A 45 720 and EP-A 80 976 describe water-in-oil emulsion polymers for cosmetic applications which require hydrophobic organic liquids such as aliphatic or aromatic hydrocarbons, animal or vegetable oils and the corresponding denatured oils as polymers in the oil phase.

The use of organic flocculants as the base of water-in-oil emulsions with an oil phase of aliphatic and/or aromatic hydrocarbons, in waste-treatment installations, for example, carries with it the growing danger of contaminating the ground water and, consequently, the supply of drinking water because of the oil residue in the sludge that is deposited.

The explanation for this lies in the fact that the treatment of sewage in a large city, for instance, causes several hundred kilograms of oil to be deposited with sewage sludge and that the decomposition of aliphatic and aromatic hydrocarbons by micro-organisms is only possible in the presence of oxygen and relatively slow even then.

To remove the danger of poisoning the soil with such hard-to-degrade oils, the sludge is now burned. Another possibility would be to use polymer water-in-oil emulsions in which the oil phase consisted of substances which are more readily bio-degradable as, for instance, in the above-mentioned DE-A 33 02 069. However, burning the oil in the sludge or using natural plant or animal oils and $C_{12-24}$ fatty-acid monoesters in the oil phase increases the cost of flocculants in the sewage-treatment installation considerably. Aside from the cost of natural oil, which is several times that of mineral oils, the natural products are less uniform and fluctuate in their composition which has an unfavorable effect on the quality of the organosol and its use as a flocculant.

A need continues to exist for polymer water-in-oil emulsions in which the continuous oil phase consists of substances which are more readily bio-degradable than the previously used hydrocarbon oils and which, compared to natural oils and fats, can be produced more economically and which have more consistent properties.

SUMMARY OF THE INVENTION

Accordingly, one object of the present invention is to provide polymer water-in-oil emulsions or organosol flocculants which are more biodegradable that previously used hydrocarbon oils.

A further object of the invention is to produce polymer water-in-oil emulsions or organosol flocculants which can be produced more economically and which have more consistent properties than natural oils and fats.

Surprisingly, it was found that aliphatic dicarboxylic acid esters which can be biologically degraded, if necessary, after hydrolysis, are extremely suitable as the oil phase in the production of polymer water-in-oil emulsions and their utilization.

DETAILED DESCRIPTION OF THE PREFERRED EMBODIMENTS

Dicarboxylic acid esters, and the dicarboxylic acids and monofunctional aliphatic alcohols needed for their production, are industrially synthesized on a large-scale. They are economical, of consistent quality and they are readily bio-degradable.

The decomposition begins with the oxygen-containing center of the molecule. If necessary after prior hydrolytic separation of the ester group, by for instance enzyme catalyzation, the carbon chain of the dicarboxylic acid and also of the alcohol are decomposed by micro-organisms through beta oxidation. Adipic acid, for instance, is known to have a pronounced absence of toxicity, since it is rapidly oxidized within the organism. It is metabolized, according to well-known tests with $C_{14}$-labeled adipic acid, by beta oxidation within the organism just like normal fatty acids.

Polymer water-in-oil emulsions, produced in accordance with the invention are environmentally compatible organosol flocculants and are suitable for water purification, for treatment of public and industrial effluents or as environmentily compatible liquidifiers for slurries of drilled minerals, for instance, when exploring or drilling for oil.

In the process of the invention, water-soluble homo- and copolymers are produced in emulsions by polymerization of water dissolved ethylenically-unsaturated compounds in which the aqueous phase is dispersed in a continuous oil phase which contains considerable quantities of aliphatic dicarboxylic acid esters. The amount of dicarboxylic acid esters in the oil phase is at least 10% by weight, preferably at least 50% by weight, and may contain up to 100% by weight of this highly biodegradable compound. In addition to the dicarboxylic acid esters which are suitable for the invention, the oil phase can also contain components which are known in the art to be used in the oil phase of polymer water-in-oil emulsions. Such components are, especially aliphatic hydrocarbons, animal or vegetable oils and fats and fatty acid monoesters.

Examples of dicarboxylic acid components of the aliphatic dicarboxylic acid esters, in accordance with the invention are: oxalic acid, malonic acid, succinic acid, glutaric acid, adipic acid, pimelic acid, suberic acid, azelaic acid and sebacic acid, which in the sequence used here, can be represented by the chemical formula

$$HOOC-(CH_2)_x-COOH$$

wherein x may be from 0 to 8. The $C_{10}$ dicarboxylic acid mixture, available commercially under the trade of Isosebacinsaure Isosebacic acid, is a dicarboxylic acid ester which can be used in the process of the invention. Adipic and sebacic acids are preferred acids.

The alcoholic components of the aliphatic dicarboxylic acid esters are monofunctional aliphatic alcohols with 1 to 20 atoms such as, for instance, methanol, ethanol, isopropanol, n-butanol isobutanol, 2-ethylhexanol, 1-decanol, 1-undecanol, 1-dodecanol, 1-hexadecanol, 1-octadecanol, isodecanol or isotridecanol. 2-Ethyl hexanol, which is produced by subsequent hydration of butyraldehyde produced by aldol-condensation during the oxo-synthesis process, is a preferred alcoholic component.

Dicarboxylic acid esters with monofunctional alcohols are used industrially as softeners or lubricants. The esters used most frequently for this purpose are those from adipic, azelaic and sebacic acids particularly with oxo alcohols or Alfolen (registered Trademark) which, when industrially produced as mixtures, contain various alcohols. The industrial production of these alcohols is described, for instance, in Ullmann's "Encyclopedia of Industrial Chemistry", 4th ed vol 7, pp 203–223. It is, therefore, also within the scope of the invention to use lubricants, known as ester oils by the industry, which are obtained as esters from aliphatic dicarboxylic acids and monofunctional aliphatic alcohols as the oil phase of organosol flocculants and during their production.

Examples of dicarboxylic acid esters, also known as ester oils and suitable for the invention, are bis-(2-ethylhexyl)sebacate, bis-(2-ethylhexyl)adipate and bis-(3, 5, 5-trimethylhexyl)adipate. Other examples of appropriate dicarboxylic acid esters are: succinic acid didodecyl ester, adipic acid dipropyl ester, and pimelic acid di-2-ethylhexyl ester. The dicarboxylic acid esters can also be used as mixtures wherein the dicarboxylic acid components and/or the alcohol components of the esters can be different. Industrial mixtures of such dicarboxylic acid esters are usually the previously mentioned ester oils.

The continuous phase of the water-in-oil emulsion, which is the dicarboxylic acid ester oil phase, is present in quantities of 20 to 60% by weight in both the polymerization of the monomer emulsion and also in the dispersion to be used.

According to the process of the invention, homo- and copolymers are produced which, as flocculants, increase the sedimentation rate of solids suspended in water. Monomers for the production of such polymers are compounds which are primarily soluble in water or in the aqueous monomer phase which are unsaturated and can be polymerized. Examples of such monomers are: acrylic acid; methacrylic acid; alkali salts of acrylic acid and methacrylic acid; the ammonium salts of these two acids; acrylamide; methacrylamide; N-substituted amides such as methyl methacrylamide, acrylamido- and methacrylamido alkyl sulfonic acids and their salts, such as 2-acrylamido-2-methyl propane sulfonic acid, known by its trade name of "AMPS" (Lubrizol Corporation); or its sodium or ammonium salt. Other water-soluble monomers for the production of polymer water-in-oil emulsions, in accordance with the invention, are acrylic and methacrylic esters of amino alcohols, such as dimethylaminoethyl methacrylate, which can also be used for polymerization in neutralized or quaternized form. Other usable water-soluble monomers are hydroxy-alkyl acrylates and methacrylates as, for instance, ethylene glycol monoacrylate and 2-hydroxy-propyl methacrylate. Also included are $\alpha,\beta$-unsaturated monomers which do not belong to the acrylic or methacrylic series and are soluble in the water phase, such as maleic acid, vinyl sulfonic acid or vinyl benzene-sulfonic acid, their alkali and ammonium salts or N-vinyl pyrrolidone.

Preferred monomers are acrylamide, methacrylamide, "AMPS", sodium acrylate, sodium methacrylate, ammonium acrylate, 2-dimethylaminoethyl methacrylate hydrochloride, 2-trimethylammoniumethyl methacrylate chloride, 2-trimethylammoniumethyl acrylate chloride, N-trimethylammoniumpropyl methacrylamide chloride and the corresponding trimethylammonium methosulfates. The acrylamide copolymers, used primarily as flocculants, contain one or more comonomers in quantities of 2 to 80% by weight related to all polymers.

For the dispersion of the aqueous monomer solution in the continuous oil phase, water-in-oil emulsifying agents with HLB values from 1 to 10, and preferably from 2 to 8, are used. (The Atlas HLB System, Atlas Chemie GmbH, EC10G July 1971. HLB-System, Rompps Chemie Lexicon, 8th edition, p. 1715, Frankh'sche Verlagshandlunq, Stuttgart).

Polymer emulsifiers are described in DE-C 24 12 266. Other known emulsifiers are, e.g., sorbitan-monostearate and sorbitan-monooleate. Emulsifiers are added to the oil phase in quantities of 0.1 to 30%, and preferably 1 to 15% by weight, as related to the entire emulsion.

The sedimentation stability of the polymer water-in-oil emulsion is improved by adding 0.1 to 10% by weight of a wetting agent whose HLB value is more than 10 to the emulsion to be polymerized. Hydrophylic, water-soluble products, for instance ethoxylated alkyl phenols, such as ethoxylated nonyl phenol with a degree of ethoxylation of 5 to 20; or soaps of fatty acids with 10 to 22 carbon atoms are suitable. The wetting agent is generally dissolved or suspended in the organic phase but it can also be added to the aqueous phase or to the finished polymer water-in-oil emulsion.

The appropriate addition of water-soluble acids, such as adipic acid or adipic acid in a mixture with other acids to transform the polymer emulsion into an aqueous solution, and their use in accordance with DE-C 22 38 017 and DE-A 32 10 752, take place already when the organosol is being made.

The share of the aqueous, dispersed phase in the monomer water-in-oil emulsion is in the range of 40 to 80% by weight, wherein the share of the water-soluble monomers of this phase is in the range of 20 to 85%, and preferably 50 to 80% by weight.

The polymerization of the monomers is carried out in the presence of the usual polymerization initiators. One may use, for instance, peroxides such as dibenzoyl peroxide, dilauroyl peroxide, hydrogen peroxide, ammonium persulfate, or azo compounds such as azodiisobutyronitrile, or oxidation-reduction (redox) systems such as ammonium persulfate/ferro sulfate, dibenzoyl peroxide/N,N-dimethyl-p-toluidine. The polymerization temperature depends on the initiator used. It may be in the range of 5° C. to about 100° C. It is appropriate to polymerize initially with a redox system with low conversion percentages and then to polymerize at higher temperatures with a peroxide initiator, for instance, which may have been part of the redox system to complete polymerization. The completion of polymerization is indicated when the emulsion bath temperature remains constant.

Other features of the invention will become apparent in the course of the following descriptions of exemplary embodiments which are given for illustration of the invention and are not intended to be limiting thereof.

EXAMPLES

Example 1

Into a monomer emulsion, made by stirring an aqueous monomer phase with the composition of:
83.6 g: acrylamide
195.6 g: 2-trimethylammoniumethyl methacrylate chloride
54.9 g: distilled water
14.4 g: mixture of about 45% by weight glutaric acid, about 35% by weight adipic acid and about 20% by weight succinic acid
and an oil phase with the composition of:
205.2 g: bis-(2-ethylhexyl) adipate (commercial product Vestinol (registered trademark) OA of the Chemische Werke Huls AG)
21 g: polymer emulsifier in accordance with DE-C 24 12 266, consisting of a mixed polymer of 30% by weight dimethylaminoethyl methacrylate and 70% by weight of a mixture of $C_{10}$–$C_{20}$ alkyl methacrylates
from which dissolved oxygen is largely eliminated by nitrogen degassing, is added 0.013 g ammonium persulfate as a 1% aqueous solution and 0.012 g $FeSO_4$ as a 1% aqueous solution, with continued stirring at a temperature between 20° to 30° C. The temperature of the emulsion rose to 35° to 41° C. At this temperature the same amounts of ammonium persulfate and $FeSO_4$ are again added as described above. The end of polymerization is indicated when the emulsion bath temperature remains constant.

The polymer emulsion is filtered through a wire net. It is self-converting and the viscosity of a 1% aqueous solution is about 9,000 mpas.

Example 2

A monomer emulsion produced from an aqueous phase corresponding to that of Example 1 and an oil phase with the composition:
138.2 g: bis-(2-ethylhexyl) adipate (Vestinol (registered trademark) OA)
52.7 g: stearic acid methyl ester
35.3 g: polymer emulsion corresponding to Example 1 is increasingly polymerized after degassing with nitrogen as in Example 1, at a temperature range of 40° to 55° C. After filtering through a wire net, an emulsion is obtained with a viscosity of 4,400 mpas which is self-converting and shows a viscosity of 6,600 mpas of the 1% aqueous solution.

Example 3

To a monomer emulsion produced with an aqueous monomer phase of the composition:
168 g: 2-trimethylammoniumethylmethacrylatechloride
102 g: Water
12.4 g: of the dicarboxylic acid mixture as given in Example 1
and of the oil phase with the composition:
138.2 g: mineral oil (Shell oil G 07)
35.2 g: (2-ethylhexyl) adipate (Vestinol (reg. trademark) OA)
17.6 g: isodecanol
35 g: polymer emulsifier corresponding to Example 1
are added 0.31 g ammonium persulfate as a 1% aqueous solution at 40° C., after degassing with nitrogen and continued stirring. Polymerization is carried out at temperature of 45° to 48° C. To the final polymerization, 0.31 g ammonium persulfate as a 1% aqueous solution is again added and then 0.005 g $FeSO_4$ as a 1% aqueous solution.

The viscosity of the organosol thus obtained is 1,700 mpas. It is self-converting with a viscosity of the 1% aqueous solution of 7,500 mpas.

Obviously, numerous modifications and variations of the present invention are possible in light of the above teachings. Therefore, it is to be understood that within the scope of the appended claims, the invention may be practiced otherwise than as specifically described.

What is claimed as new and desired to be secured by Letters Patent of the United States is:

1. A biodegradable water-organosol flocculant emulsion, comprising:
   (i) a continuous organic phase, said organic phase comprising at least one member selected from the group consisting of aliphatic hydrocarbons, animal and vegetable oils, fats, fatty acid monoesters and aliphatic dicarboxylic acid esters, wherein said organic phase comprises at least 10 wt. % of said aliphatic dicarboxylic acid ester;
   (ii) a finely distributed aqueous polymer phase, said aqueous polymer phase comprising one or more homopolymers or copolymers selected from the group consisting of polymers of acrylates, methacrylates, acrylamides and methacrylamides and salts thereof, dispersed in water, said aqueous polymer phase distributed within said organic phase; and
   (iii) one or more emulsifying agents.

2. The biodegradable organosol flocculant of claim 1, wherein said organic phase contains at least 50% by weight of said aliphatic dicarboxylic acid ester.

3. The biodegradable organosol flocculant of claim 1, further comprising emulsion stabilizers.

4. The biodegradable organosol flocculant of claim 1, wherein said dicarboxylic acid ester is an ester of a dicarboxylic acid with the formula $HOOC-(CH_2)_x-COOH$, where x is 0 to 8.

5. The biodegradable organosol flocculant of claim 4, wherein said dicarboxylic acid is adipic acid, azelaic acid or sebacic acid.

6. The biodegradable organosol flocculant of claim 1, wherein the alcohol component of said dicarboxylic acid esters is a monofunctional alcohol with 1 to 20 C atoms.

7. The biodegradable organosol flocculant of claim 1, wherein said dicarboxylic acid ester contains an oxo alcohol as the alcohol component.

8. The biodegradable organosol flocculant of claim 1, wherein said dicarboxylic acid ester is a mixture of dicarboxylic acid esters.

9. The biodegradable organosol flocculant of claim 1, wherein said dicarboxylic acid ester contains ester oils.

10. The biodegradable organosol flocculant of claim 4, wherein said dicarboxylic acid ester is an ester of adipic acid.

11. The biodegradable organosol flocculant of claim 10, wherein said dicarboxylic acid ester is adipic acid bis-(2-ethylhexyl) adipate.

12. The biodegradable organosol flocculant of claim 9, wherein said ester oil is bis-(2-ethylhexyl)sebacate, bis-(2-ethylhexyl) adipate or bis-(3, 5, 5-trimethylhexyl) adipate.

* * * * *

UNITED STATES PATENT AND TRADEMARK OFFICE
CERTIFICATE OF CORRECTION

PATENT NO. : 4,824,894

DATED : APRIL 25, 1989

INVENTOR(S) : SCHNEE ET AL

It is certified that error appears in the above-identified patent and that said Letters Patent is hereby corrected as shown below:

Column 2, line 31, delete "that" and insert --than--.

Column 6, line 9, delete "emulsion" and insert --emulsifier--;

line 63, delete "metahcrylates" and insert --methacrylates--.

Signed and Sealed this

Twelfth Day of June, 1990

Attest:

HARRY F. MANBECK, JR.

*Attesting Officer*       *Commissioner of Patents and Trademarks*